Patented June 18, 1940

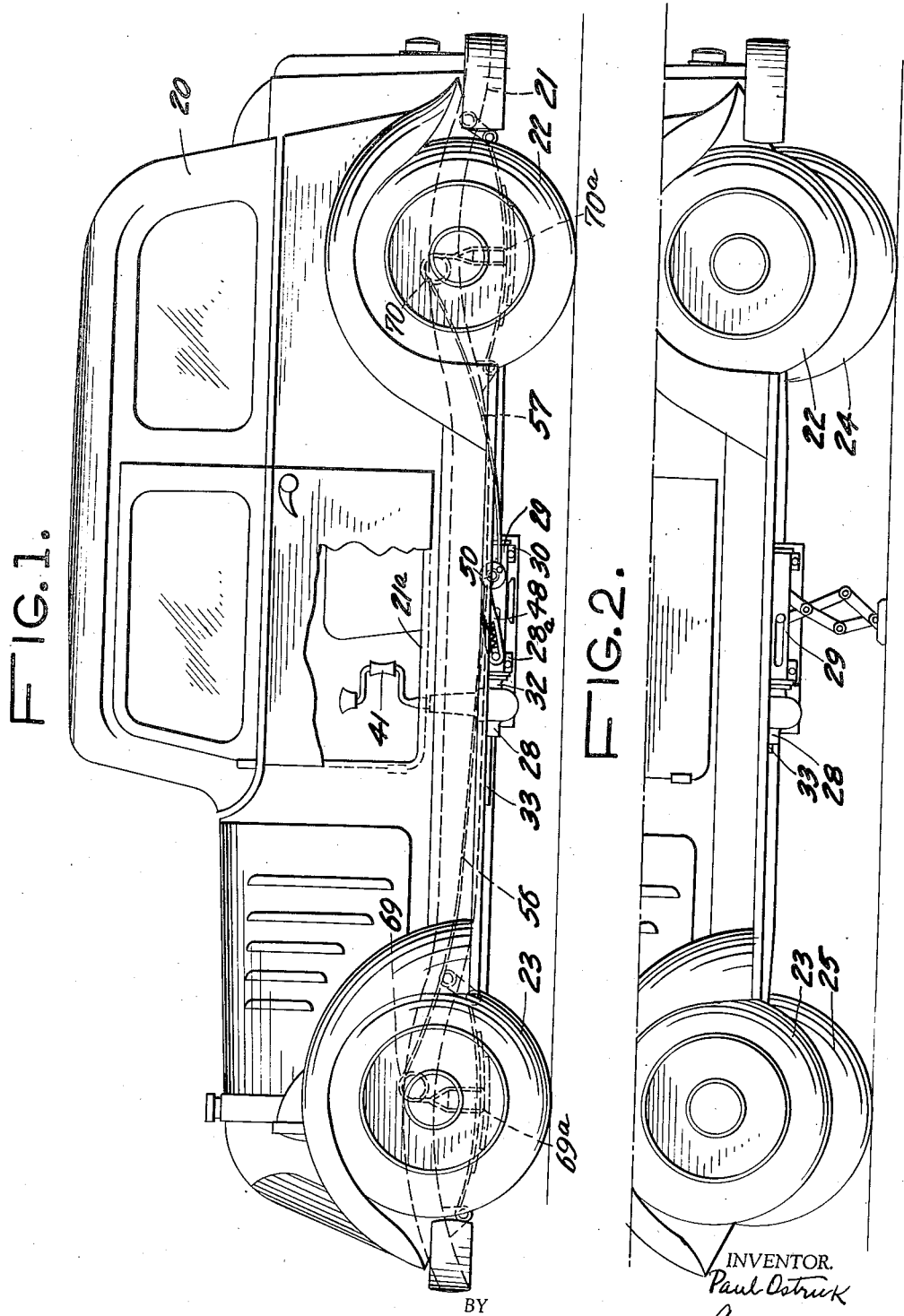

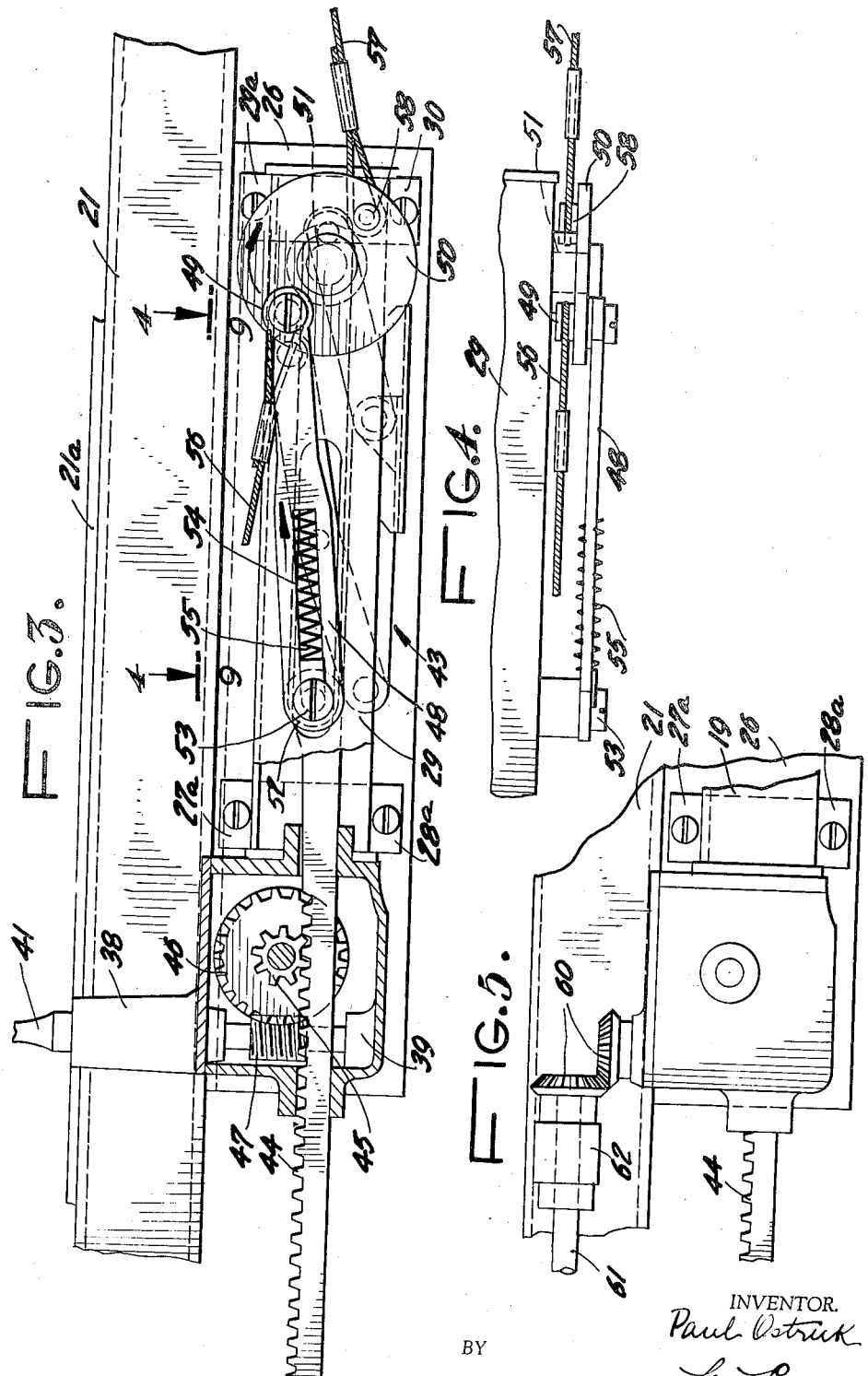

2,204,997

UNITED STATES PATENT OFFICE 2,204,997

COMBINATION LIFTING JACK AND WHEEL LOCKING ARRANGEMENT FOR AUTOMOBILES OR LIKE VEHICLES

Paul Ostruk, New York, N. Y.

Application May 25, 1937, Serial No. 144,571

4 Claims. (Cl. 254—86)

This invention relates to automotive jacking devices, especially of the kind that is operated by hand, said operation being preferably inside the body of the car.

An object of this invention is to provide a jack that is operated by mechanical means through the medium of a hand operated handle manipulated by the occupant of the automobile.

A further object of the invention is to provide a jack that is so arranged that when in operation, said jack is enabled to lock the wheels of the car. The locking of the wheels of said car serves as a means for facilitating the removal of the tires of said wheels.

By means of this invention said wheels may be made to lock simultaneously with the operation of the jack shown.

A further object of the invention is to provide a lifting jack which can be operated from the front or rear of the car by a handle operated by the car operator.

Referring to the figures—

Fig. 1 illustrates a car with a portion of the door cut away in order to show the handle that is employed for manually operating the jack.

Fig. 2 shows the car in a jacked or lifted up position.

Fig. 3 is a side view of the jack arrangement.

Fig. 4 is a detail view of the cable arrangement of said jack taken on a line 4—4 of Fig. 3.

Fig. 5 is a modification of the arrangement involved in the operation of the jack to that shown in Fig. 1.

Referring to Fig. 1, the numeral 20 represents the body of the car, 21 is the chassis of said car, 21ª is the flooring of said car, 22 and 23 are the wheels on one side of the car, 24 and 25 are wheels on the opposite side. The chassis 21 is provided with an angle iron section 26 which is secured to the chassis 21' by means of the screws as shown in Fig. 3.

The casting 28 is secured to the body of the jack 29. Said jack 29 is secured to the angle iron section 26 by means of extensions 27ª, 28ª, 29ª and 30 (see Fig. 3). The casting 26 is provided with two bearings.

Referring to Fig. 3 the jack 43 is operated by means of a geared rack 44, the latter in turn being operated by a spur gear 45 which is turned by means of the worm gear 46 and a companion worm 47, the latter in turn is turned by means of the manually operated handle 41.

In Fig. 3 there is also shown an arrangement for locking the wheels of a car into place simultaneously with the operation of the jack proper.

The aforesaid arrangement consists of a link arm 48 one end 49 of said link arm being secured to a disc 50, said disc turning a swivel 51. The opposite end 52 of the link arm 48 is secured to the geared rack 44 by means of a pin 53 the latter being also secured to the jack 43 proper. A slot 54 is located inside the body of the link arm 48 said slot housing a spring 55. A pair of flexible cables 56 and 57 are secured to the disc 51 at the point designated by the numerals 49 and 58, said cables are secured respectively over pulleys 69 and 70, said pulleys are secured to the chassis of said car. The ends 69ª and 70ª respectively are secured to the car cushion springs as shown in Fig. 1.

The operation of this arrangement for locking the wheels will hereinafter be explained.

In Fig. 5 is shown an arrangement for operating a jack somewhat different from that shown in Fig. 3, the manner of operating said jack being from the inside of the car as shown in Fig. 1, the latter figure showing the manually operated handle positioned immediately above the jack in this particular case. The operation aforesaid is performed by means of a pair of bevel gears 60 and a shaft 61 the latter turning in bearing 62. The shaft 61 can be operated by the handle aforesaid at any fixed location on the car body; for example, at a fixed position at the front, or at the rear or at the sides of said car body.

Referring again to Fig. 3, when the jack is started into operation, the pin 53 which is located inside the slot 54 of the arm 48 is forced against the pressure of the spring 55 thus moving the arm 48 in the direction indicated by the arrow. As the arm 48 is pivoted to the disc 50, said arm turns said disc in a clock-wise direction and in such a manner that the flexible cables 56 and 57 which are also secured to the disc 50, are brought into tension thus forcing the springs of said car upward and locking said springs to the chassis 21.

In the operation of the arrangement just described, the spring and axles of the car are completely locked before the lazy tong jack reaches the ground because of the fact that the pin 53 continues to move after the wheels of said car are locked. The pressure of the handle 48 is taken up by the spring 55.

Referring to Fig. 5, the jack as shown in said figure is operated in a manner similar to the jack described in Fig. 3, the essential difference being that instead of operating the same jack from the inside of the car the jack is operated by the handle 41 from any particular fixed locations inside of the car.

It is understood that the particular jacking arrangement described herein is intended to be merely illustrative and not illuminative of the invention, since it is obvious that the invention may be affected by jacking arrangements for automobiles or like vehicles arranged in many other different ways, within the scope of the claims.

Now having described my invention what I claim is:

1. In a combination lifting jack and wheel locking arrangement integral to the body of an automobile or similar vehicle, said arrangement comprising a shaft, a manually operated handle attachable to said shaft, intermediary gearing means for operably connecting said shaft with a lifting jack whereby said jack may be expanded or retracted, said intermediary gearing means likewise in operable engagement with cable or equivalent strap means for locking the springs and axles in said vehicle concurrently with the operation of the lifting jack aforesaid.

2. In a lifting jack and wheel locking arrangement for automobiles or like vehicles, said arrangement having a housing, a shaft extending into said housing, a manually operated handle attachable to said shaft, said shaft engaging gearing means also within said housing, said gearing means for connecting said shaft with a geared rack, said geared rack pivotally connected to a lifting jack whereby said lifting jack may be expanded or retracted by the reciprocal movement of said rack that is initially operated through the medium of said manually operated handle, said geared rack likewise operably connected to cable or equivalent strap means for locking the springs and axles of said vehicle on the forward movement of said geared rack and to unlock said springs and axles on the retractive movement of the geared rack aforesaid.

3. In a combination lifting jack and wheel locking arrangement integral to the body of an automobile or similar vehicle, said arrangement comprising a shaft, a manually operated handle attachable to said shaft, intermediary gearing means for operably connecting said shaft with a lifting jack, said intermediary gearing means likewise in operable engagement with a pivotally movable arm, said arm moving against the retracting pressure of a spring; a rotatably moving disc operably connected with said arm, two cables oppositely positioned to said disc, said cables secured to the cushion springs of said vehicle, the movement of said disc to cause the locking of said cushion springs through the medium of said cables concurrently with the lifting of said vehicle by the lifting jack aforesaid.

4. In a jack arrangement of the class described attached to an automobile or like vehicle, said arrangement including a housing, said housing having therein a shaft, said shaft in engagement with and operable by gearing means, said gearing means made operable through the medium of a manually operated handle, the rotatable movement of said shaft engageable with gearing means, said gearing means in operable engagement with a geared rack, said geared rack operating a lifting jack for jacking up said automobile, said geared rack also in operable engagement with a pivotally movable arm, said arm connected with a disc, said disc in turn operably moving two flexible cables or bands that are attached to said disc at one end of each of said cables and the opposite ends of said cables attached to respective pulley supports contiguous to cushion springs of said automobile, and the forward movement of said rack causing said cushion springs to lock through the medium of the rotatable movement of the disc aforesaid.

PAUL OSTRUK.